United States Patent
Okada

(10) Patent No.: US 7,352,396 B2
(45) Date of Patent: Apr. 1, 2008

(54) EDGE EMPHASIZING CIRCUIT

(75) Inventor: Hidefumi Okada, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 945 days.

(21) Appl. No.: 10/387,155

(22) Filed: Mar. 12, 2003

(65) Prior Publication Data

US 2003/0179299 A1    Sep. 25, 2003

(30) Foreign Application Priority Data

Mar. 20, 2002    (JP)    ............................. 2002-077423

(51) Int. Cl.
   *H04N 5/208*    (2006.01)
   *H04N 5/228*    (2006.01)
(52) U.S. Cl. .................. 348/252; 348/222.1
(58) Field of Classification Search ................ 382/266; 348/252, 222.1
   See application file for complete search history.

(56) References Cited

U.S. PATENT DOCUMENTS 6,449,060 B1 * 9/2002 Kawai et al. ................ 358/1.9
6,628,330 B1 * 9/2003 Lin ............................. 348/252
2001/0017619 A1 * 8/2001 Takeuchi ..................... 345/204

FOREIGN PATENT DOCUMENTS

| JP | 06205244 A | * 7/1994 | |
| JP | 07074986 A | * 3/1995 | |
| JP | 08-163408 | 6/1996 | ...................... 5/21 |
| JP | 2000-050290 | 2/2000 | ........................ 9/7 |
| JP | 2001-223941 | 8/2001 | .................... 5/232 |
| JP | 2001-285672 | 10/2001 | .................... 5/208 |

* cited by examiner

*Primary Examiner*—Ngoc-Yen Vu
*Assistant Examiner*—Adam L. Henderson
(74) *Attorney, Agent, or Firm*—Gerald T. Bodner

(57) ABSTRACT

An edge emphasizing circuit includes a first high-frequency detection circuit and a second high-frequency detection circuit. A spatial frequency of a raw image signal corresponding to a photographed object is detected by the first high-frequency detection circuit or the second high-frequency detection circuit, and a gain corresponding to a detection result is made effective. The gain to be made effective is decreased as the spatial frequency of the raw image signal is low. The gain is applied to an edge emphasizing signal generated by the edge emphasizing circuit, and the raw image signal is added to the edge emphasizing signal to which the gain is applied. Thus, a raw image signal with an emphasized edge is obtained.

4 Claims, 4 Drawing Sheets

HIGH-FREQUENCY COMPONENT VALUE D (A) RAW IMAGE SIGNAL (B) EDGE EMPHASIZING SIGNAL (C) EDGE EMPHASIZING SIGNAL (WITH GAIN)

(D) RAW IMAGE SIGNAL (EMPHASIZED)

EDGE EMPHASIZING CIRCUIT

BACKGROUND OF THE INVENTION

1. Field of the Invention

The present invention relates to an edge emphasizing circuit. More specifically, the present invention relates to an edge emphasizing circuit which is applied to a video camera and performs edge emphasizing on each of pixels forming an image signal output from an imager.

2. Description of the Prior Art

In a conventional edge emphasizing circuit, when an edge emphasizing signal generated based on an image signal is superimposed on an image signal, amplitude of the edge emphasizing signal is varied depending upon light and shade of an image. More specifically, a gain is increased as to a high-luminance image and a gain is decreased as to a low-luminance image.

However, in the prior art, amplitude is not varied depending upon whether a portion to be corrected is an edge portion or a plane portion, and when noise is superimposed on the high-luminance image, the noise is emphasized. That is, in the prior art, there are problems that edge emphasizing becomes insufficient upon reducing the noise, and the noise is conspicuous upon enhancing the edge.

SUMMARY OF THE INVENTION

Therefore, it is a primary object of the present invention to provide an edge emphasizing circuit capable of emphasizing an edge with reducing noise.

According to the present invention, an edge emphasizing circuit which performs edge emphasizing on each of pixels forming an image signal output from an imager comprises: a determiner for determining a spatial frequency at around a target pixel; and a changer for changing a degree of the edge emphasizing depending upon a determination result of the determiner.

When an edge emphasizing is performed on each of the pixels forming the image signal, the determiner determines the spatial frequency at around the target pixel, and the changer changes a degree of the edge emphasizing depending upon the determination result of the determiner. The degree of the edge emphasizing is changed on the basis of the spatial frequency, and therefore, noise of small amplitude is never subjected to the edge emphasizing. Thus, it is possible to realize proper edge emphasizing.

The changer decreases the degree of the edge emphasizing as the spatial frequency is low. Furthermore, in a case of generating an edge emphasizing signal by a generator, the changer changes amplitude of the edge emphasizing signal.

In a case of assigning color information of a plurality of colors to each of the pixels color by color, the determiner performs determination in a different manner depending upon colors assigned to the target pixel. Furthermore, in a case the plurality of colors include green, the determiner performs determination on the basis of color information of green.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
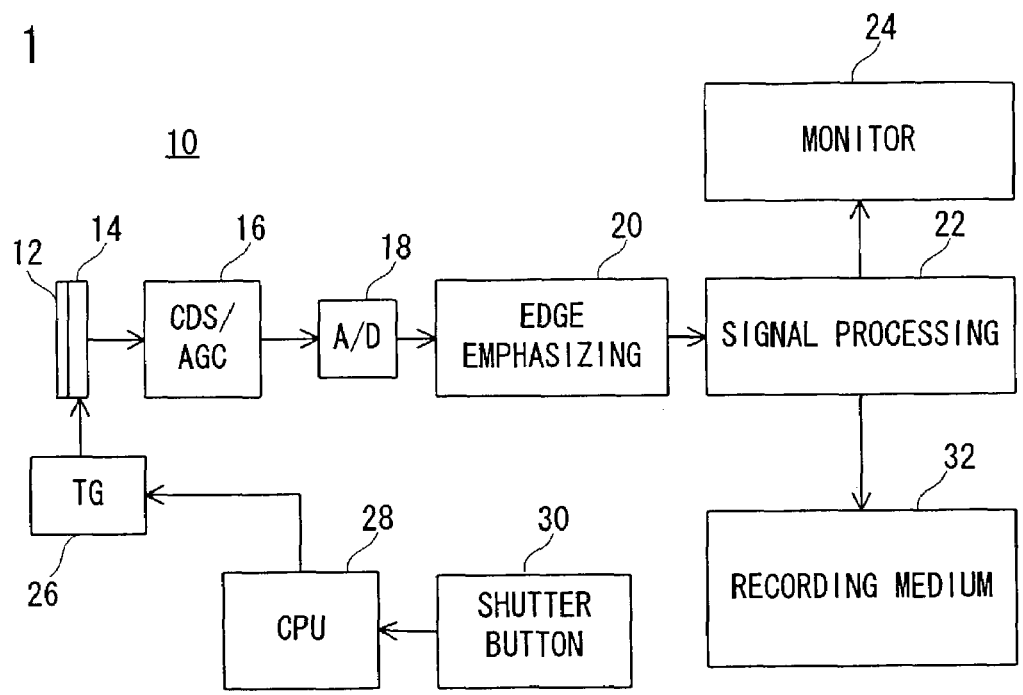
FIG. 1 is a block diagram showing a configuration of one embodiment of the present invention.
Figure 2:
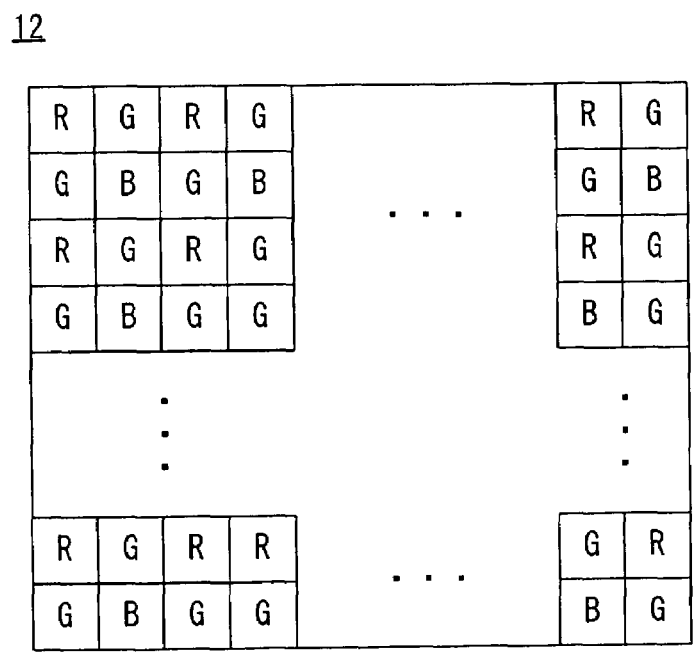
FIG. 2 is an illustrative view showing one example of a color filter applied to FIG. 1 embodiment.

Referring to FIG. 1, a digital video camera 10 of this embodiment includes an image sensor 14 for generating electrical charges by photoelectric conversion. A light-receiving surface of the image sensor 14 is provided with a color filter 12 having a primary color Bayer array shown in FIG. 2, and an optical image of an object is incident on the light-receiving surface of the image sensor 14 through such the color filter 12. Accordingly, an amount of the electric charges generated in each of light receiving elements reflects an amount of light of R (red), G (green) or B (blue).

When a real-time motion image (through image) of the object is displayed on a monitor 24, a CPU 28 instructs a timing generator (TG) 26 to perform thin-out reading. The TG 26 applies a corresponding timing signal to the image sensor 14 so as to drive the image sensor 14 in a thin-out reading manner. Thus, a low-resolution raw image signal in which each of the pixels has color information of R, G or B is read from the image sensor 14.

The read raw image signal is input to a signal processing circuit 22 through noise removal/gain adjustment by a CDS/AGC circuit 16, A/D conversion by an A/D converter 18 and edge emphasizing processing by an edge emphasizing circuit 20. The signal processing circuit 22 performs a series of processes such as color separation, white balance adjustment, YUV conversion and NTSC encoding on the input raw image signal so as to generate a composite video signal in compliance with an NTSC format. The generated composite video signal is applied to the monitor 24 and whereby, a through image of the object is displayed on the monitor 24.

When a shutter button 30 is depressed, the CPU 28 instructs the TG 26 to perform all pixels reading. The TG 26 drives the image sensor 14 in an all the pixels reading-out manner and whereby, a high-resolution raw image signal is read from the image sensor 14. The read raw image signal is a signal having color information of R, G and B as described above, and applied to the signal processing circuit 22 through the CDS/AGC circuit 16, the A/D converter 18 and the edge emphasizing circuit 20. The signal processing circuit 22 executes a series of the processes described above (color separation→white balance adjustment→YUV conversion→NTSC encoding) so as to display a freeze image of the object on the monitor 24. The signal processing circuit 22 further performs JPEG compression on a YUV signal obtained by the YUV conversion and records a compressed image signal on a recording medium 32.

Figure 3:
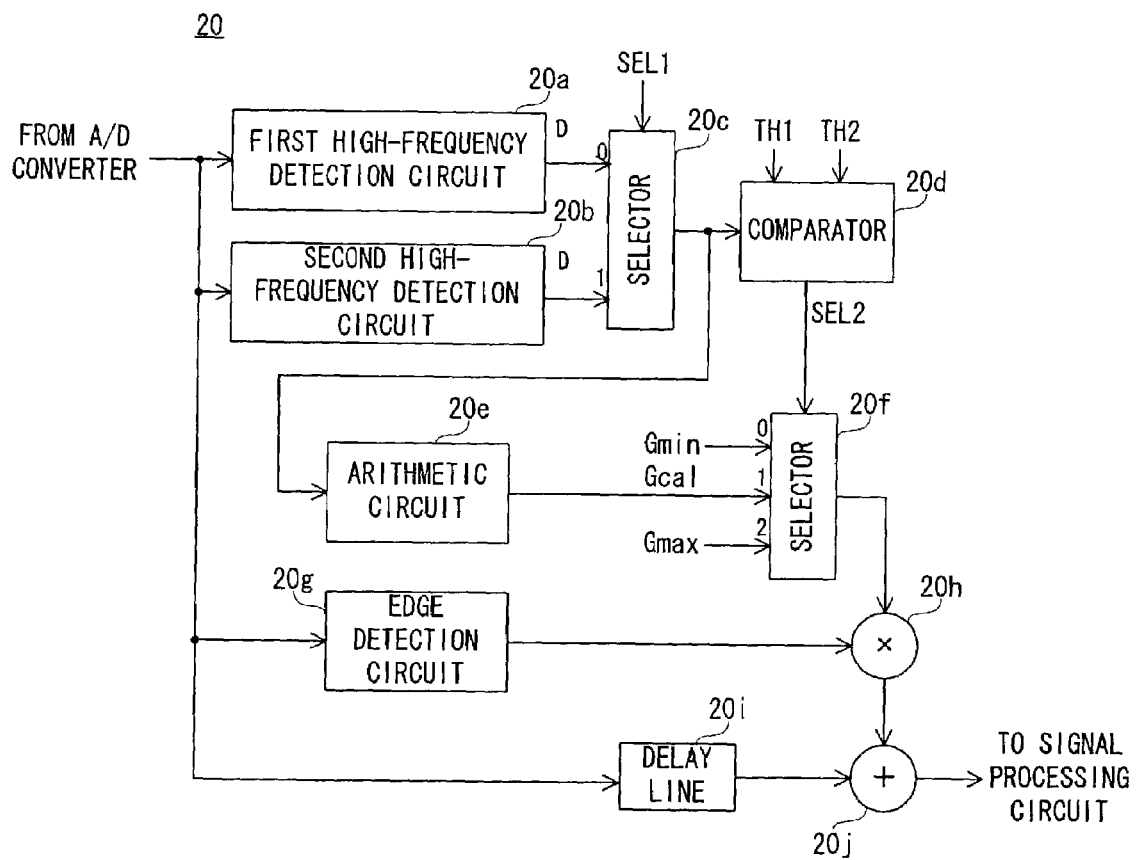
FIG. 3 is a block diagram showing one example of a configuration of an edge emphasizing circuit applied to the FIG. 1 embodiment.

The edge emphasizing circuit 20 is specifically configured as shown in FIG. 3. The raw image signal input from the A/D converter 18 is applied to a first high-frequency detection circuit 20a and a second high-frequency detection circuit 20b. The first high-frequency detection circuit 20a performs an arithmetic operation shown by an equation 1 on pixels G23, G32, G34 and G43 shown in FIG. 4(A), and the second high-frequency detection circuit 20b performs an arithmetic operation shown by an equation 2 on pixels G22, G24, G33, G42 and G44 shown in FIG. 4(B).

$$D=(|G23-G32|+|G34-G43|+|G23-G34|+|G32-G43|)/4 \quad \text{[equation 1]}$$

$$D=(|G22-G33|+|G33-G44|+|G24-G33|+|G33-G42|)/4 \quad \text{[equation 2]}$$

A control signal SEL1 of 1 bit indicates "0" when a pixel currently input from the A/D converter 18 (target pixel) is an R pixel or a B pixel, and indicates "1" when the target pixel is a G pixel. A selector 20c selects an output of the first high-frequency detection circuit 20a when SEL1=0, and selects an output of the second high-frequency detection circuit 20b when SEL1=1.

Figure 4:
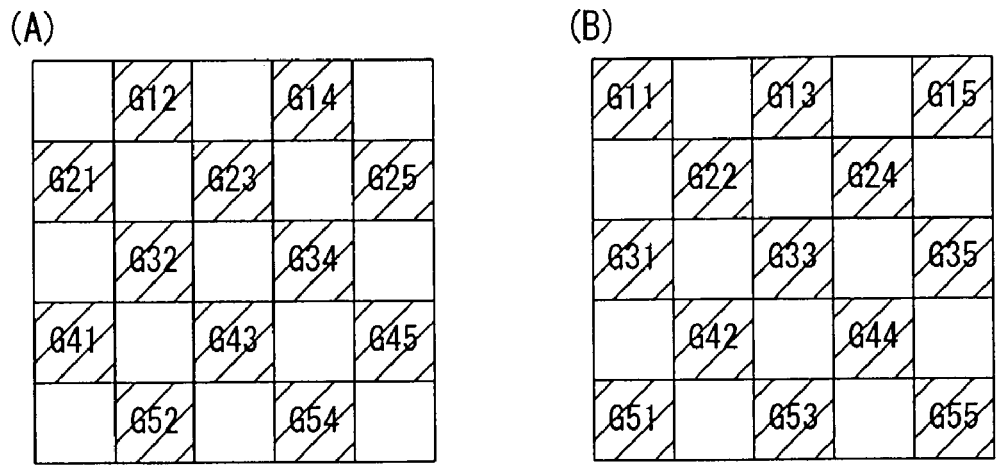
FIG. 4(A) is an illustrative view showing a distribution state of surrounding pixels at a time a target pixel is an R pixel or a B pixel.
FIG. 4(B) is an illustrative view showing a distribution state of surrounding pixels at a time the target pixel is a G pixel.

The color filter 12 is a filter of the primary color Bayer array as described above and therefore, the R pixel or the B pixel is present at a center of a matrix shown in FIG. 4(A), and the G pixel is present at a center of a matrix shown in FIG. 4(B). Furthermore, a color the most reflecting a luminance transition is G out of R, G and B. Therefore, when the target pixel is the R pixel or the B pixel, the equation 1 is made effective, and when the target pixel is the G pixel, the equation 2 is made effective, so that a high-frequency component value D output from the selector 20c indicates a numeric value corresponding to an transition amount of the luminance around the target pixel, i.e., a spatial frequency relating to brightness around the target pixel. The high-frequency component value D increases as the spatial frequency is high and decreases as the spatial frequency is low. The high-frequency component value D output from the selector 20c is applied to a comparator 20d and an arithmetic circuit 20e. The comparator 20d compares the high-frequency component value D with each of threshold values TH1 and TH2 (TH1<TH2) and outputs an control signal SEL2 of 2 bits corresponding to a comparison result. That is, if D<TH1 holds, SEL2=00, if TH1≦D<TH2 holds, SEL2=01, and if TH2≦D holds, SEL2=10. A selector 20f selects a minimum gain Gmin (>0) when SEL2=0, selects a calculation gain Gcal output from the arithmetic circuit 20e when SEL2=01 and selects a maximum gain Gmax (=1) when SEL2=10.

In the arithmetic circuit 20e, an operation shown by an equation 3 is performed on the high-frequency component value D applied from the selector 20c.

$$Gcal=((D-TH1)*Gmax+(TH2-D)*Gmin))/(TH2-TH1) \quad \text{[equation 3]}$$

According to the equation 3, a difference between the high-frequency component value D and the threshold value TH1 is multiplied by the maximum gain Gmax, and a difference between the threshold value TH2 and the high-freqency component value D is multiplied by the minimum gain Gmin. Furthermore, the sum of the respective multiplied values is divided by a difference between the threshold values TH1 and TH2.

Figure 5:
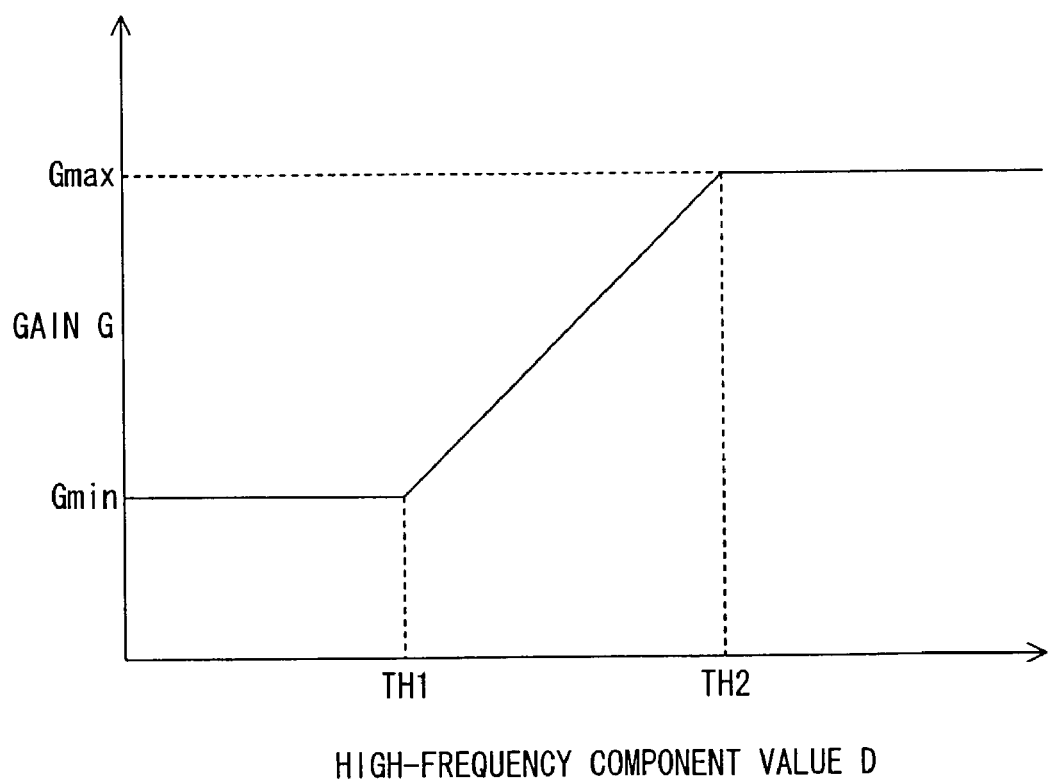
FIG. 5 is a graph showing a relationship between a high-frequency component value and a gain.

Accordingly, the gain G output from the selector 20f has a characteristic shown in FIG. 5. According to FIG. 5, G becomes Gmin in a range D<TH1 holds, G becomes Gmax in a range TH2≦D holds, and G linearly changes in a range TH1≦D<TH2 holds.

Figure 6:
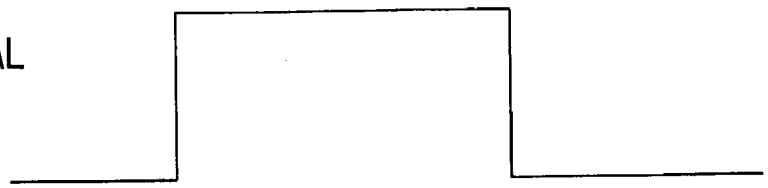
FIG. 6(A) is a waveform chart showing a raw image signal.
FIG. 6(B) is a waveform chart showing an edge emphasizing signal.
FIG. 6(C) is a waveform chart showing an edge emphasizing signal to which a gain is applied.
FIG. 6(D) is a waveform chart showing a raw image signal to which an edge emphasizing is subjected.
Figure 6:
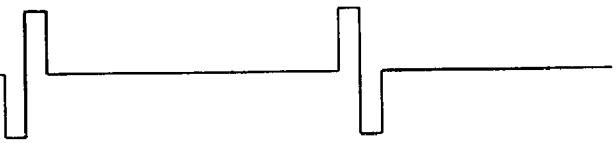
Figure 6:
Figure 6:
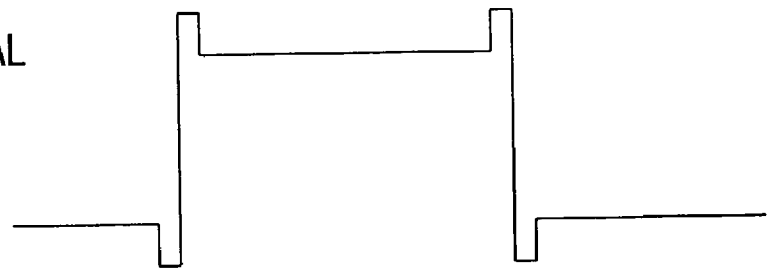

The raw image signal input from the A/D converter 18 is also applied to an edge detection circuit 20g. The edge detection circuit 20g detects an edge of the applied raw image signal in horizontal and vertical directions and generates an edge emphasizing signal. When a raw image signal shown in FIG. 6(A) is input for example, an edge emphasizing signal shown in FIG. 6(B) is output from the edge detection circuit 20g.

The edge emphasizing signal output from the edge detection circuit 20g is multiplied by the gain G output from the selector 20f in a multiplier 20h. Thus, when the edge emphasizing signal shown in FIG. 6(B) is output from the edge detection circuit 20g, and the gain G less than "1" is output from the selector 20f, an edge emphasizing signal shown in FIG. 6(C) is generated by the multiplier 20h. An adder 20j adds the edge emphasizing signal output from the multiplier 20h to the raw image signal output from the A/D converter 18 and passes through a delay line 20i. When the raw image signal shown in FIG. 6(A) and the edge emphasizing signal shown in FIG. 6(C) are added with each other, a raw image signal with an emphasized edge is generated as shown in FIG. 6(D).

As can be understood from the above description, the spatial frequency of the raw image signal is detected by the first high-frequency detection circuit 20a or the second high-frequency detection circuit 20b, and the gain G is determined based on the detected spatial frequency. The gain G is decreased as the spatial frequency of the raw image signal is low. The gain G is applied to the edge emphasizing signal generated by the edge emphasizing circuit 20g, and the raw image signal is added to the edge emphasizing signal to which the gain G is applied, and whereby, the raw image signal with an emphasized edge can be obtained. Since amplitude of the edge emphasizing signal is thus changed depending upon the spatial frequency of the raw image signal, it is possible to perform edge emphasizing on the high-luminance image on which noise is superimposed without emphasizing the noise.

It is noted that although a description is made utilizing a video camera in a digital system in the embodiment, it is needless to say that the present invention can be applied to a video camera in an analog system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An edge emphasizing circuit which performs edge emphasizing on each of pixels forming an image signal output from an imager, comprising:
   a generator for generating a first edge emphasizing signal based on said image signal;
   a detector for detecting a magnitude of a high-frequency component that is included in said image signal and corresponding to a spatial frequency at around a target pixel;

a determiner for determining said magnitude by comparing with a first threshold value and a second threshold value being larger than said first threshold value;

a gain setter which sets a minimum gain when said determiner determines that said magnitude is smaller than said first threshold value, a maximum gain when said determiner determines that said magnitude is larger than said second threshold value and a middle gain that is changeable between said minimum gain and said maximum gain according to said magnitude of said high-frequency component when said determiner determines that said magnitude exists between said first and second threshold;

a producer for producing a second edge emphasizing signal by applying one of said minimum gain, maximum gain and middle gain to said first edge emphasizing signal; and an adder for adding said second edge emphasizing signal to said image signal output from said imager.

2. An edge emphasizing circuit according to claim 1, wherein color information of a plurality of colors is assigned to each of pixels forming the image signal output from said imager color by color, and said detector performs a detection of said magnitude of said high-frequency component in a different manner depending upon a color which is assigned to the target pixel.

3. An edge emphasizing circuit according to claim 2, wherein said plurality of colors includes green, and said detector performs said detection on the basis of color information of green.

4. An edge emphasizing method which performs edge emphasizing on each of pixels forming an image signal output from an imager, comprising the steps of:

(a) generating a first edge emphasizing signal based on said image signal;

(b) detecting a magnitude of a high-frequency component that is included in said image signal and corresponding to a spatial frequency at around a target pixel;

(c) determining said magnitude by comparing with a first threshold value and a second threshold value being larger than said first threshold value;

(d) setting a minimum gain when said determiner determines that said magnitude is smaller than said first threshold value, a maximum gain when said determiner determines that said magnitude is larger than said second threshold value and a middle gain that is changeable between said minimum gain and said maximum gain according to said magnitude of said high-frequency component when said determiner determines that said magnitude exists between said first and second threshold;

(e) producing a second edge emphasizing signal by applying one of said minimum gain, maximum gain and middle gain to said first edge emphasizing signal; and (f) adding said second edge emphasizing signal to said image signal output from said imager.

* * * * *